United States Patent [19]
Wolff

[11] 4,228,135
[45] Oct. 14, 1980

[54] DOOR AND SEAL CONSTRUCTION FOR STERILIZERS

[75] Inventor: Robert Wolff, Mantoloking, N.J.

[73] Assignee: Better Built Machinery Corporation, Saddle Brook, N.J.

[21] Appl. No.: 831,768

[22] Filed: Sep. 9, 1977

[51] Int. Cl.² .......................... A61L 3/00; E06B 7/22
[52] U.S. Cl. ...................................... 422/296; 49/477; 220/232
[58] Field of Search ........................ 21/93–98, 21/103, 104; 49/477; 220/232; 23/289, 290; 422/295–299

[56] References Cited

U.S. PATENT DOCUMENTS

| | | | |
|---|---|---|---|
| 2,859,987 | 11/1958 | Emley | 49/477 |
| 2,878,532 | 3/1959 | Clark | 49/228 |
| 3,178,779 | 4/1965 | Clark et al. | 220/232 |
| 3,325,042 | 6/1967 | Brown | 220/232 |
| 3,339,785 | 9/1967 | Nugent | 220/232 |
| 3,352,446 | 11/1967 | Anderson et al. | 220/232 |
| 3,371,986 | 3/1968 | Brown | 220/232 |
| 3,488,142 | 1/1970 | Cooper | 21/93 |
| 3,694,962 | 10/1972 | McDonald et al. | 220/232 |
| 3,788,651 | 1/1974 | Brown et al. | 220/232 |
| 3,857,199 | 12/1974 | Frach et al. | 49/477 |

*Primary Examiner*—Bradley R. Garris
*Attorney, Agent, or Firm*—Edward H. Loveman

[57] ABSTRACT

Apparatus for sterilizing laboratory and hospital glassware, liquids, instruments, garments, contaminated animal wastes and bedding and the like, utilizing a sterilizer enclosure having a steam jacket surrounding the same and a vertically movable front door closure, wherein the door is vertically slideable in a track and is substantially restrained from outward movement by restraining means only at its upper and lower end, and including expandable seal members surrounding the sterilizer opening and opposite the door. The seal comprises two discrete segments, an inflatable member for displacing the sealing member against the door in sealing relationship therewith, and a sealing member. The construction is designed for maximum safety and ease of operation at minimum cost.

5 Claims, 7 Drawing Figures

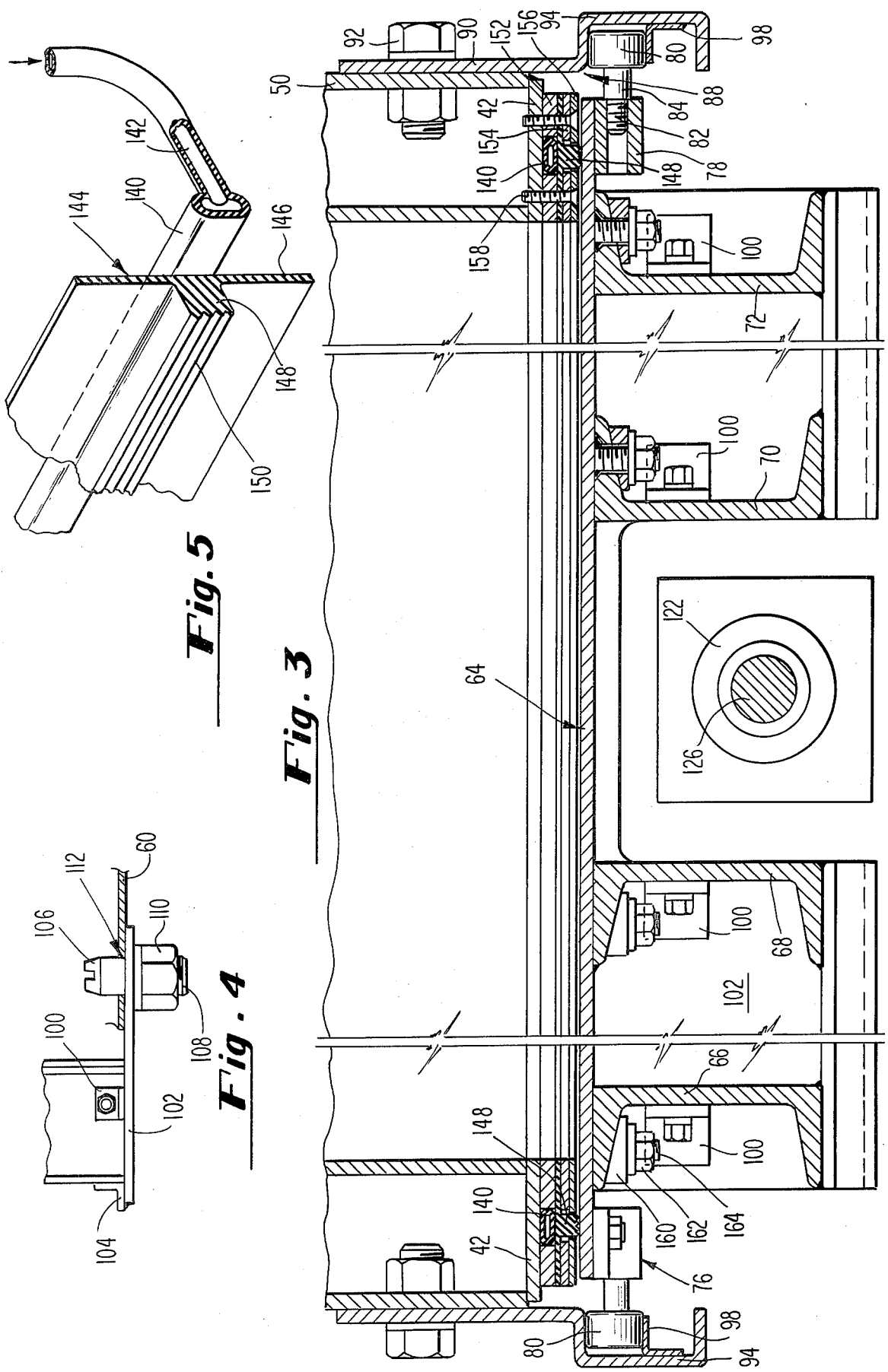

DOOR AND SEAL CONSTRUCTION FOR STERILIZERS

BACKGROUND OF THE INVENTION

1. Field of the Invention

The invention relates to sliding door and inflatable seal constructions for sterilizing apparatus of the type utilized to sterilize hospital and laboratory glassware, liquids, instruments, parenteral solutions, and paper and fabric materials, such as surgical gowns, sheets and pillow cases, contaminated animal wastes and bedding, and like objects.

2. State of the Art

Steam sterilizers are well known and are extensively utilized in hospitals, laboratories and other facilities for sterilizing many types of solid, liquid-containing and porous objects. Typical such sterilizers are illustrated in U.S. Pat. Nos. 3,325,042, 3,339,785, 3,371,986, and 3,488,142.

The foregoing sterilizer designs have substantial limitations in their door constructions, in that the door constructions are relatively expensive to make, difficult to operate and do not represent optimum design. For example, in U.S. Pat. No. 3,371,986, the door is indicated as being required to be restrained about three sides and has a reinforced fourth side, in order to maintain an adequate seal and door strength and to prevent the door from being "blown off" inadvertently under the substantial pressures of the sterilizer interior. U.S. Pat. No. 3,488,142 is alleged to be an improvement over the design of the foregoing patent, in that it provides restraint of the door about four sides in order to prevent problems that three-sided restraint is inadequate to prevent. The two foregoing designs are, nonetheless, not optimum, in that it is desirable to be able to restrain the door about only two sides, for convenience, ease of fabrication and therefore lower cost, and which is simpler and more convenient to operate.

In addition, door seals represent a substantial problem, particularly due to the abrasion of the door seals from glass objects in the sterilizer, some of which may break inadvertently, and glass particles may abrade and even pierce the door seal member, thus creating the inconvenience, "down time" and expense of replacement of the door seal member. It is therefore desirable to design a sliding door and seal construction which minimizes the likelihood of door seal wear and replacement, and which facilitates the replacement thereof when necessary.

U.S. Pat. No. 3,042,980 is the most relevant reference known to applicant from the standpoint of the specific design of the seal construction which is the subject of this patent application.

BRIEF SUMMARY OF THE INVENTION

The invention of this patent application is directed to a sterilizer door of the vertically or horizontally movable type and a seal construction therefor, and is desirably used for a sterilizer having a steam jacket surrounding the sterilizing chamber, and in which the sterilizer interior is supplied with high temperature, pressurized steam to do the sterilization. The preferred type of sterilizer to which the door and seal construction of this invention are desirably applied is disclosed in my co-pending U.S. patent application Ser. No. 755,440, filed Mar. 14, 1977, now U.S. Pat. No. 4,108,601, to "Sterilizing Apparatus and Process."

Vertically and horizontally sliding sterilizer doors are well known in the art. However, in the competitive sterilizer market, it is desirable to be able to improve on existing sterilizer designs and constructions to provide a safe and efficient sterilizer door construction which is less expensive to construct and is easily operated, without sacrificing safety.

The apparatus of the invention is restrained only at two faces of the door, its top face and its bottom face, thereby avoiding the necessity for heavy structural steel restraining members on either of its two sides. The door is constructed with the use of stiffeners to strengthen the door per se, thereby cutting down on the quantity of materials necessary for the door without sacrificing strength.

The door operates on a track, with rollers fastened to the door, sliding in a track member mounted on each side of the door. The track member is mounted at a slight angle with respect to the front face of the sterilizer, so that the door retracts slightly more than $\frac{1}{8}''$, for example, from the front face of the sterilizer when the door is lowered or raised, as the case may be, to the open position. This spacing prolongs the life of the sealing member, by allowing pieces of glass, from broken vials and the like, which tend to accumulate in the sterilizer opening, to drop down to the floor and not remain embedded in or abrading the sealing member.

The sealing member itself is constructed in two separate portions. The actuator member is expandable and is in communication with a suitable source of pressurized fluid which expands the actuator member, thereby pressing the seal member into sealing engagement with the inner face of the door.

The seal member itself is formed as a separate unit from the actuator member, and is constructed for optimum sealing effect, maximum life and to facilitate replacement of the seal member itself, without replacing the actuator member.

It is important to note that, in a common size of a sterilizer door having an inner area of 600 square inches, a normal pressure of 30 psi within the sterilizer enclosure creates a load of 18,000 pounds over the door. This indicates the important need for an effective seal which will prevent the leakage of this high temperature steam into the atmosphere surrounding the sterilizer and for a sufficiently strong door, mounted with adequate restraining means to prevent accidental distortion or dislodging of the door due to the effect of the steam pressure within the sterilizer.

OBJECTS OF THE INVENTION

It is therefore an object of this invention to provide a sterilizer door and seal construction which is safe, effective and long lasting and can be made relatively inexpensively and conveniently operated.

Yet another object of this invention is to provide a sterilizer door for a pressurized sterilizer which is restrained only along two of its four edges.

A further object of this invention is to provide a sterilizer door seal construction formed of two separate members, an actuator member and a seal member, so that one member of the seal assembly can be replaced without the necessity for replacing the other member.

A concomitant object of this invention is to provide a sterilizer door construction which uses a minimum amount of material, consistent with the safety and strength requirements for a pressurized steam sterilizer.

These and other objects of this invention will be readily perceived from the following detailed description of the invention, when read in connection with the appended drawings.

DESCRIPTION OF THE DRAWINGS

FIG. 3 is a fragmentary cross-sectional view, taken along line 3—3 of FIG. 1;

FIG. 4 is a fragmentary view, partly in cross-section, of the locking pin and tie plate illustrated in the lower left-hand corner of the sterilizer housing of FIG. 2;

FIG. 5 is an enlarged fragmentary perspective view, partly in cross-section, of the sealing means of the invention;

DETAILED DESCRIPTION OF THE INVENTION

Figure 1:
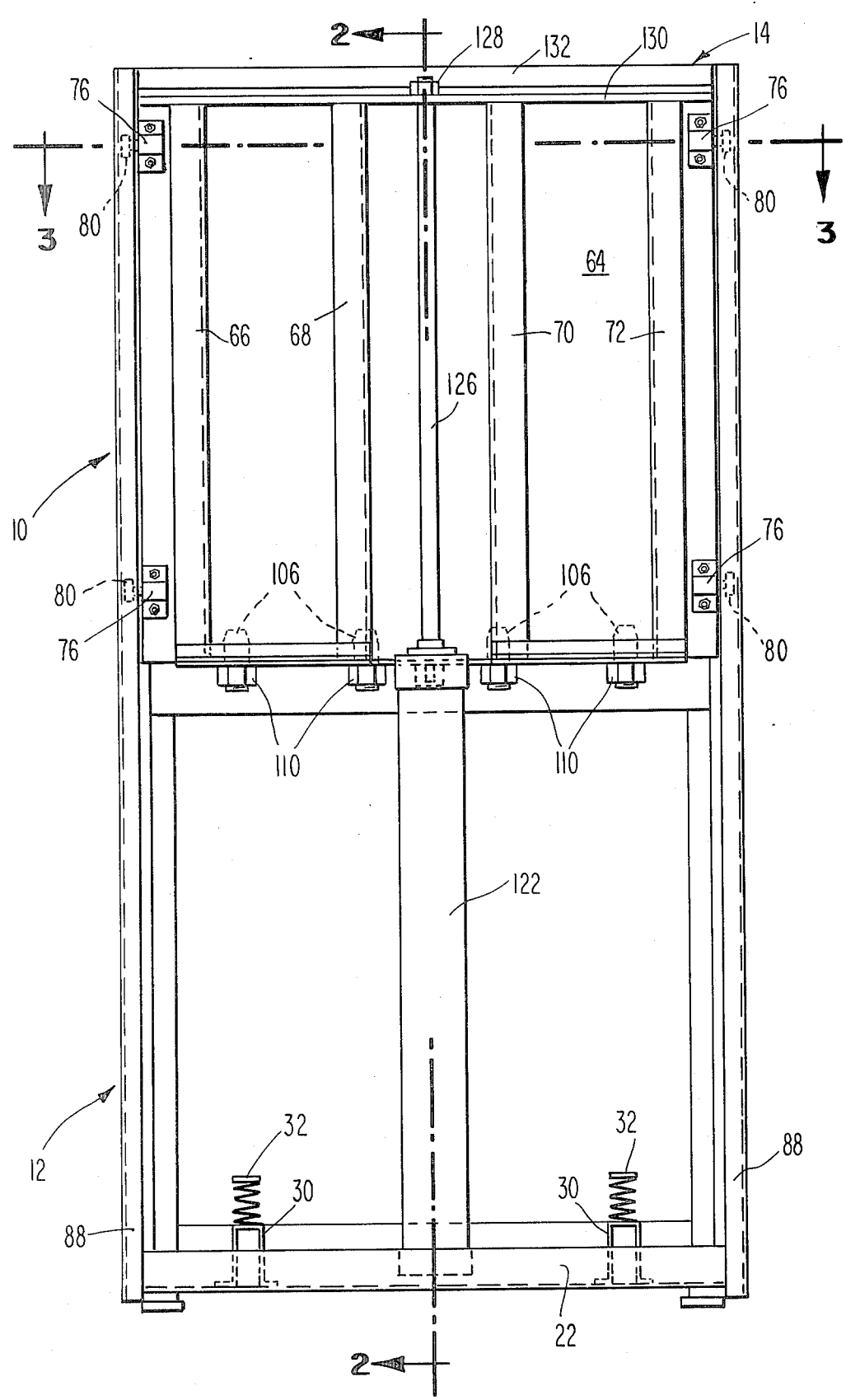
FIG. 1 is a front elevational view of a sterilizer constructed in accordance with the principles of this invention.
Figure 2:
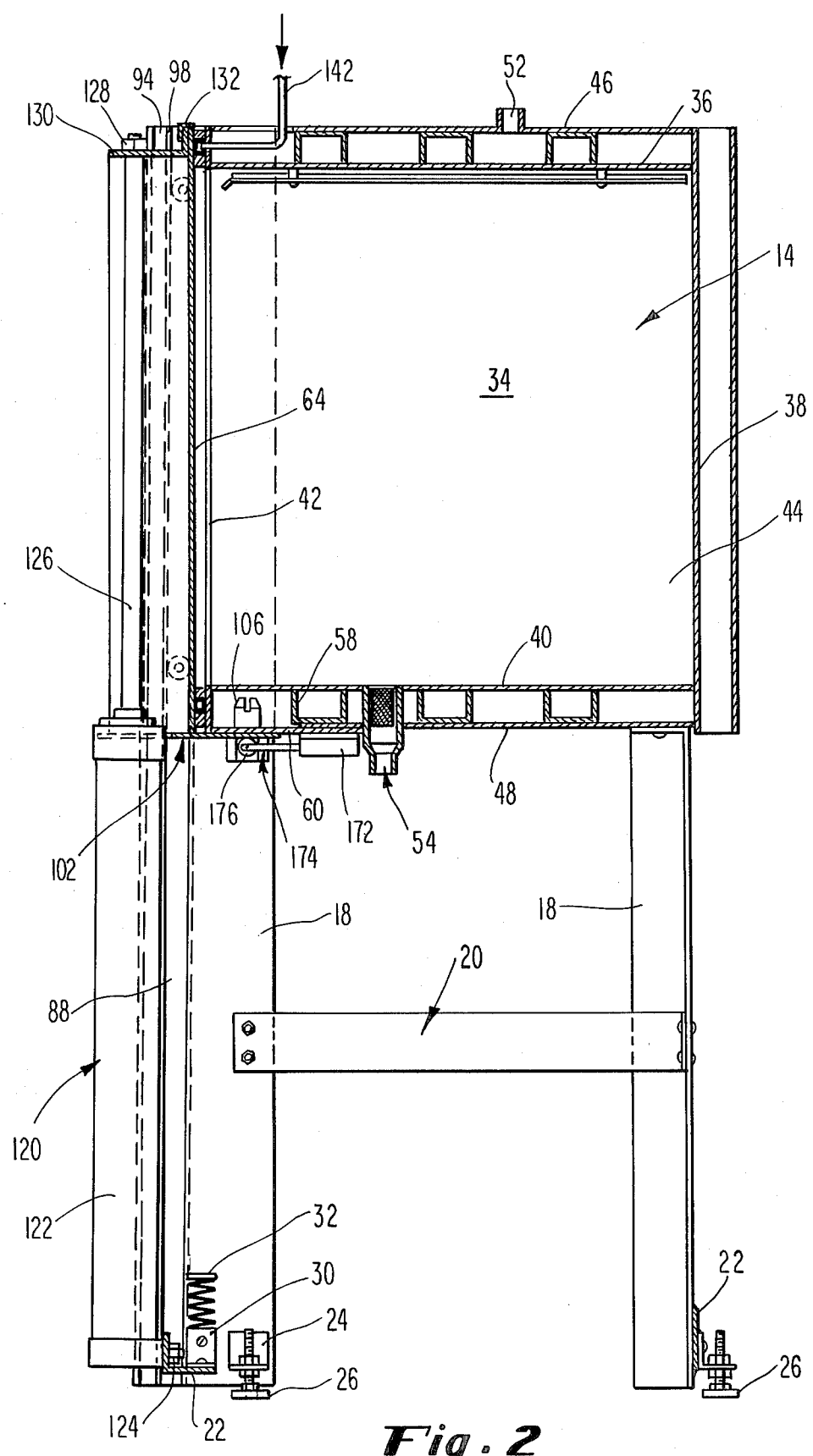
FIG. 2 is a cross-sectional view, taken along line 2 of FIG. 1.

Viewing FIG. 1, a sterilizer unit, generally designated by numeral 10, is seen to comprise a support frame, generally designated by numeral 12, and a sterilizer enclosure, generally designated by numeral 14. As best seen in FIGS. 1 and 2, the support frame 12 comprises four legs 18, formed of L-shaped members interconnected and braced by bracing means 20 and 22. The side braces 20 are fastened, as by bolting or riveting, to the corresponding legs 18 and are of rectangular cross-section. The bottom braces 22, one of which is seen in FIG. 1 and both of which are seen in cross-section in FIG. 2, rigidify the assembly. The forward brace 22 is L-shaped in cross-section and supports members 30, described below. The rear brace is of rectangular cross-section.

As best seen in FIG. 2, each leg 18 has a L-shaped bracket 24 bolted or welded thereon, to vertically adjustably support a screw-mounted leveling leg 26, one of which is mounted to each leg 18 to allow the legs individually to be adjusted, so that the sterilizer may be made level.

Mounted, as by bolting on the front cross-brace 22, is a pair of spring support members 30, each of which mounts a suitable spring 32, fastened thereto, the purpose of which is to absorb any force caused by lowering of the sterilizer door and minimize undue vibration of the sterilizer assembly.

The sterilizer per se is generally designated by numeral 14. The sterilizer interior is generally designated by numeral 34 and is best seen in FIG. 2. The sterilizer 14 is defined by sterilizer top plate 36, sterilizer back plate 38, sterilizer bottom plate 40, sterilizer front plate 42 and sterilizer side plates 44. The sterilizer steam jacket is defined by outer walls, including upper jacket-defining wall 46, lower jacket-defining wall 48, and side walls 50 (best seen in FIG. 3).

An inlet 52, seen in FIG. 2, introduces steam to the jacket and a drain 54 is provided in the bottom of the jacket, to allow drainage of steam and liquid from the sterilizer. The jacket is reinforced by the U-shaped stiffeners 58. It will be noted, from a careful examination of FIG. 2, that the outer shell of the bottom of the jacket wall 48 terminates at the left-most stiffener 58, and that a separate tie plate 60 is fastened below wall 48 and extends to the front of the sterilizer. Steam does not have access to the hollow areas to the left of the left-most reinforcing means 58 in FIG. 2, so that the aperatures formed in the bottom and top of the jacket respectively to permit introduction of locking pins 106 (described below) and an air hose 142 (also described below) do not leak to the atmosphere steam introduced into the jacket.

Viewing FIGS. 1 and 3, the door of the sterilizer, generally designated by numeral 64, is a single metal plate. Fastened to the door are four metal stiffeners, respectively designated 66, 68, 70 and 72, the purpose of which is to stiffen the door and strengthen it from buckling under the pressure of the steam within the sterilizer. The stiffeners are U-shaped channel members.

Each of the respective channel members 66, 68, 70 and 72 has bolted thereto, proximate its lower-most end, an L-shaped mounting bracket 100, the purpose of which is to support the bottom restraining plate 102 which extends along the lower edge of the door and underlies a portion of the bottom of the sterilizer, as seen in FIGS. 2 and 4. Additional L-shaped brackets 104 are fastened, as by welding, to the locking plate 102 and to the respective channels 66, 68, 70 and 72 for strength purposes.

As seen in FIGS. 1 and 4, there are four engaging or locking pins 106, each of which has a split, tapered upper end, and a threaded lower end and which is fixed to the locking plate 102 by means of nut 110. Each of the pins 106 engages in a vertically aligned aperature 112 in the overlying tie plate 60. The locking plate 102 has a central cut-out section, as best seen in FIG. 3, to avoid interfering with the hydraulic piston and cylinder assembly 112, 126 more fully described below.

Channel member 66, 68, 70 and 72 are fastened to door 64 by means of studs 164, which are welded to door 64 and are fastened by nuts 162. The angular washers 160 assist in mounting the bolts to the angular webs of the respective channel members.

Mounted on the opposite sides of door 64 are mounting brackets 76, each of which mounts a rotatable roller 80. As seen in FIG. 3, the mounting brackets are flat and include an aperatured base section 78 in which the threaded end 82 of the roller shaft 84 is seated. The mounting brackets are bolted to the door, as seen in FIG. 3.

The rollers 80 operate in vertical slide channels, generally designated by numeral 88, comprising an elongated web 90, which is fastened to the outer side plate 50 of the sterilizer, as by bolts 92, and which has a U-shaped roller channel 94, in which is welded L-shaped guide member 98, which extends the length of the channel and merely acts to hold the rollers in place. The slide channels 88 are formed of sheet metal and perform no significant function in restraining door 64 from the steam pressure in the sterilizer. The guide member 98 is used, because the sheet metal of slide channels 88 cannot be formed precisely enough snugly to hold the rollers.

Mounted to L-shaped bracket 22, as best seen in FIG. 2, is the pneumatic or hydraulic piston and cylinder assembly 120, which is fastened at the base of cylinder 122 by a suitable bolt 124. Piston 126 is part of the pneumatic or hydraulic cylinder assembly. The piston rod has a threaded upper end, which is fastened, as by nut 128, to the L-shaped flange member 130, which is welded to the top of the door plate 64. The door is thereby raised and lowered with the raising and lowering of piston 126. Fastened, as by welding, to the top plate 46 of the sterilizer enclosure is an L-shaped restraining flange 132.

The restraining flange 132 serves as an upper limit to the door 64 and, by snugly overlying the vertical web of flange 130, restrains the door 64 from outward displacement by the pressure of the steam within sterilizer chamber 34.

Figure 6:
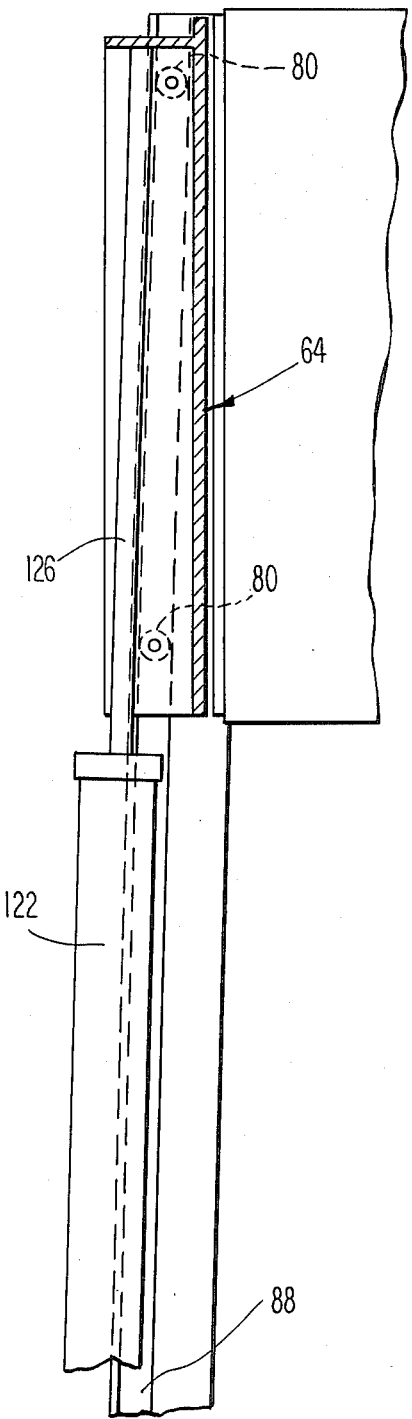
FIG. 6 is a fragmentary side elevational view, partly in cross-section, showing the door in the closed position and the spacing between the sterilizer door and the outer wall of the sterilizer unit.
Figure 7:
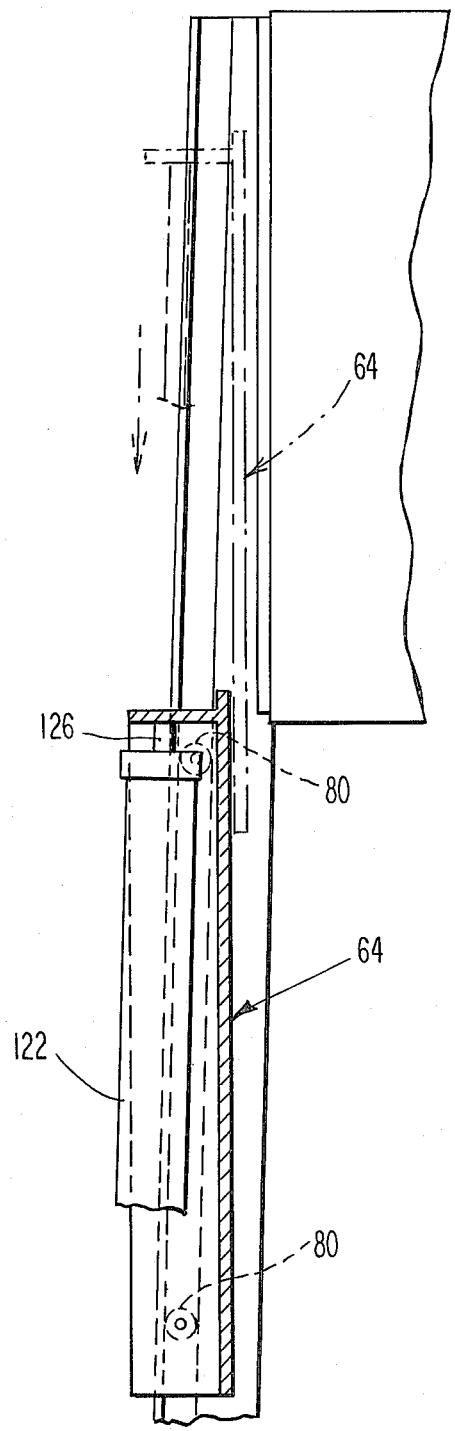
FIG. 7 is a view, similar to FIG. 6, with the sterilizer door in the lowered position.

Tracks 88 extend substantially from the floor to the sterilizer top, as seen in FIG. 2, and is fastened to the legs 18 of frame 12 by suitable fastening means or by welding (not shown). Track 88 is mounted at a slight angle from the vertical, as best seen in FIGS. 6 and 7. The angle of the track is adjusted so that, when the door 64 is in the position illustrated in FIG. 6, there is a space of approximately 0.030 inches between door 64 and the front plate 42 of the sterilizer unit. This space is sealed by the displacement of the seal member 144 as described below. When the door 64 is lowered to the position shown in FIG. 7, it is desirable to create an additional gap of at least about ⅛" between a vertical extension of the lowered door 64 and the front plate 42 of the sterilizer unit, to allow any slivers or fragments of glass which may be caught or engaged in the space between the seal 144 and the door to drop to the ground. Otherwise, the slivers could be abraded into the seal 148 as the door is lowered and would accelerate the wear and reduce the life and efficacy of the seal. The movement of the door from the seal greatly reduces the "scrubbing" action of the door on the seal, thereby extending the life of the seal.

In FIG. 7, the door is shown in its lowered position and there is also shown in phantom the door is an intermediate position, before being completely lowered, so that the leftward displacement of the door can be seen. Since the door 64 is approximately 26 inches high, and the displacement to the left is only about ⅛", it will be appreciated that FIGS. 6 and 7 are substantially exaggerated to allow the angularity and displacement more effectively to be seen. The track 88 and the hydraulic piston and cylinder assembly are mounted at a very slight angle, so that the door 64 is vertical in the position shown in FIG. 6, but is retracted but still vertical in the position shown in FIG. 7.

As seen in FIG. 3, the front face of the sterilizer has a series of cover plates which are screwed (or otherwise fastened) to the end plate or ring 42 of the sterilizer, for the purpose of providing a channel for removably seating the actuator 140 and sealing means 144. The actuator is a substantially elliptical, closed piece of silicone rubber or ethylene-propylene having a durometer of 60, to provide the necessary abrasion resistance, sealing property and resistance to temperature. This actuator is formed with an integral, flexible conduit 142 which extends upwardly through an aperture in the jacket cover plate 46 to a suitable source of supply of high pressure air, water or other fluid.

The sealing member 144 is comprised of a pair of flanges 146 and an engaging seal portion 148 formed with ridges 150 which engage the inner surface of the door 64. Sealing member 144 is held in place by sandwiched pairs of circumferential locking plates 152, 154 and 156 encircling plate 42. The flanges of sealing member 144 are sandwiched between plates 152 and 154.

The sandwich assembly is held in place by 3 pairs of screws 158 which screw into the end plate or ring 42. If desired, each overlying pair of plates 154 and 156 could be formed as a single unit, but for economy of manufacture separate pieces are utilized. It will be noted from the left-hand side of FIG. 3, that two plates 154 are spaced farther from the edges of seal member 148 than are the two plates 156. The small space between plates 156 leaves a minimum open gap of approximately 0.25 inches, to minimize the access of pieces of glass to the sides of the seal, whereas the greater space between opposing members 154 facilitates the sealing displacement of the seal under the pressure of air or other fluid in actuator 140.

The seal member 144 can easily be replaced by unscrewing the respective pairs of screws 158 and removing the cover plates 154 and 156.

The seal member 144 is produced in a single closed strip, to encircle the entire sterilizer door opening. The actuator member 140 is also formed as a single closed loop member.

As best seen in FIG. 2, an additional safety device is provided to prevent accidental downward displacement of the door 64. Cylinder 172 is mounted, as by welding, to tie plate 60. Cylinder 172 includes piston 174 which has, rotatably mounted on its end, roller 176 which abuts, in the position shown in FIG. 2, door restraint member 102. In the position illustrated in FIG. 2, roller 176 supports door 64 and prevents its inadvertent downward displacement. Cylinder 172 is included in the pneumatic or hydraulic system for the sterilizer, and is operated to move the piston to the right (considering FIG. 2) to the unlocking position, in order not to impede the downward movement of the door, at an appropriate time the sterilization cycle, after the sterilization has been completed and the sterilizer evacuated.

All of the inside plates of the sterilizer unit are desirably formed of one-quarter inch steel plate with a 10% pure nickel cladding. This is the material of choice because it combines the necessary characteristics of strength, temperature resistance and corrosion resistance with minimum weight and cost. Other temperature and corrosion resistant materials, such as stainless steel, could be used, but the cost of stainless steel is often prohibitive. The top restraint member 132 is desirably formed of three-quarters inch steel angle bar to provide adequate strength, and is desirably bolted to the jacket. Door 64 is preferably made of one-quarter inch steel plate, clad with nickel on the inside to prevent corrosion. Tie plate 60 is one-quarter inch steel plate and is welded to the enclosure jacket. The pins 106 are desirably made of steel and are one-and-five-sixteenths inches in diameter. All of the other outer materials of the unit are made of aluminum, so as to be non-corrosive and to minimize material weight.

In a desirable embodiment of the invention, the pneumatic or hydraulic cylinder supplies pneumatic or hydraulic fluid under a pressure of 50 to 60 psi. The outer dimensions of the sterilizer enclosure 14 are desirably 26"×26", although it will be appreciated that different sizes and shapes of sterilizing units might be desired.

Although the materials of seal member 144 and actuator 140 are desirably 60 durometer ethylene propylene rubber, it is within the purview of this invention to form the door seal and actuator of any flexible, high temperature resistant material, such as silicone rubber. Since the door size can vary, from unit to unit, the length of the seal 144 and actuator 140 will vary commensurately, and conventional door sizes are 26"×26", 16"×26" and 24" by 36".

In a preferred embodiment of the invention, the actuator 140 is of toroidal cross-section having a one-sixteenth inch wall, one-quarter inch height, and a one-half inch width. The seal member 144 has a web thickness of one-thirty-second of an inch, an edge to edge width of the web of 2⅛", the height of the seal portion 148 from the underside of the web to the peak of the engaging ridges 150 is 9/32" and the lateral width of seal member 148 is three-eighths inch.

It will be appreciated that the specific dimensions, materials and structural details of the disclosed invention can be varied by the skilled artisan without departing from the spirit and scope of the invention.

What is claimed is:

1. A sterilizer construction comprising:
   (a) an enclosure defining an access opening;
   (b) a rigid door having dimensions slightly greater than said access opening;
   (c) roller members mounted on opposite sides of said door;
   (d) elongated guide track means mounted opposite the sides of said access opening;
   (e) said rollers being movably mounted in said guide track means;
   (f) means to restrain said door from displacement under pressure of fluid in said enclosure, said means consisting of restraining means extending substantially along two parallel edges of said door and enclosure;
   (g) a plurality of stacked cover plates forming a channel surrounding said access opening;
   (h) a sealing means comprising two discrete components in said channel, the first of said components being hollow and expandable when provided with fluid under pressure from a suitable source of supply, the second of said components overlying said first-named component and comprising a pair of flanges and an engaging seal portion which engages the inner surface of said door when said first-named component is expanded, said flanges being sandwiched between said plates.

2. Apparatus as set forth in claim 1, wherein said door is vertically movable and said restraining means comprises an L-shaped plate extending along the upper end of said enclosure and having a vertically depending lip adapted restrainingly to overlie said door, and a horizontally extending plate mounted to the underside of said door and having a plurality of vertically extending pins fastened thereto, the bottom of said enclosure having a plurality of aligned holes in vertical alignment with said pins whereby said pins engage in said holes when said door is in the elevated position.

3. Apparatus as set forth in claim 2, including locking means to engage the lower end of said door and prevent, in the locking position, downward displacement of said door.

4. Apparatus as set forth in claim 1, wherein said track is mounted at a small angle with respect to the vertical axis, wherein said door in its closed position is spaced a small distance from the opening of said enclosure, and in a lower position is spaced a substantially greater distance therefrom.

5. Apparatus as set forth in claim 1, wherein said sealing means is made of ethylene propylene or silicone rubber.

* * * * *